April 17, 1928.

O. A. MAY

LOCK

Filed Sept. 12, 1927

INVENTOR
O. A. May
BY
Munn & Co.
ATTORNEY

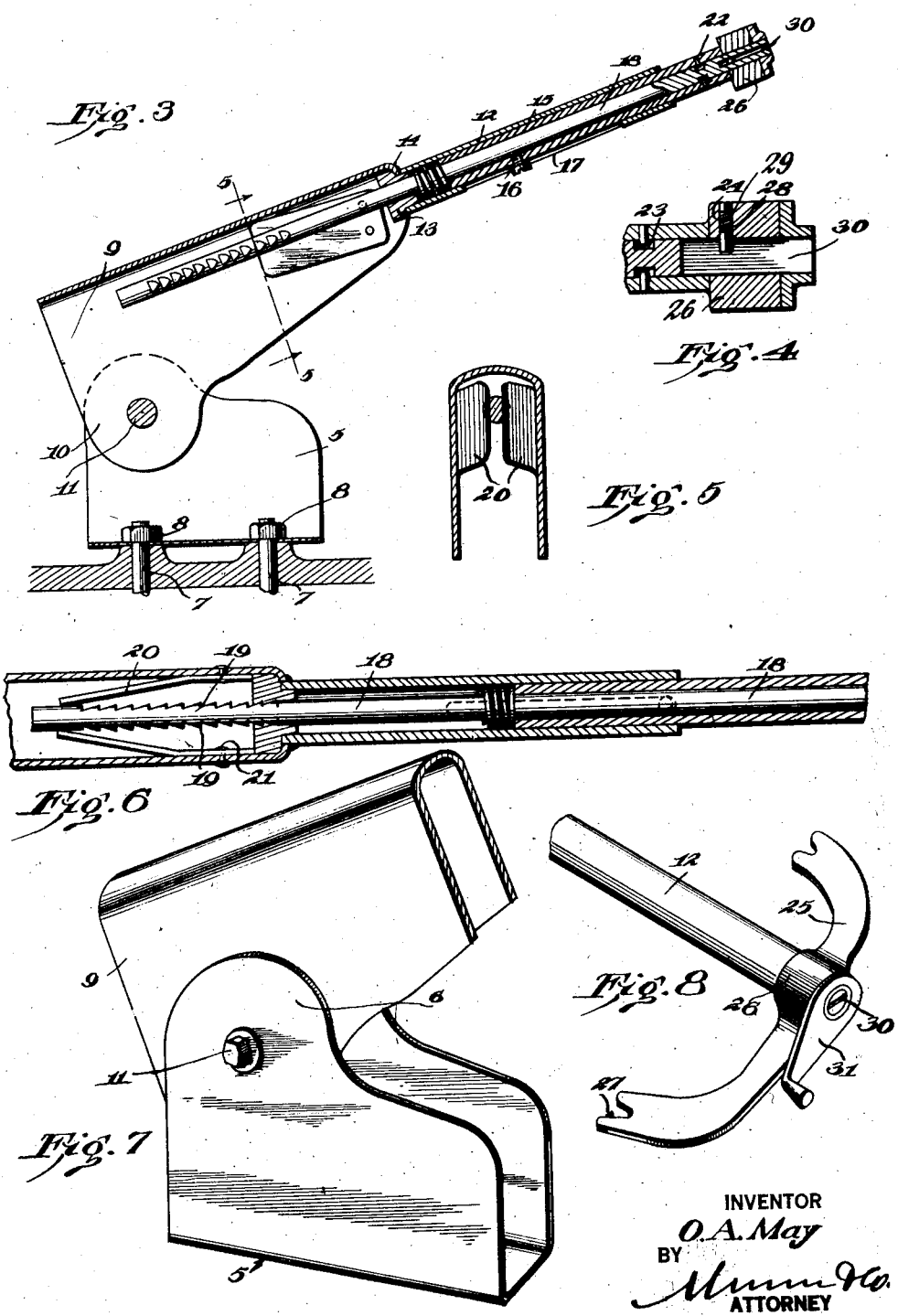

Patented Apr. 17, 1928.

1,666,786

UNITED STATES PATENT OFFICE.

OTTO ADOLPH MAY, OF ALBUQUERQUE, NEW MEXICO.

LOCK.

Application filed September 12, 1927. Serial No. 219,140.

My invention relates to automobile locks, and an object thereof is to provide a lock arranged to engage and hold the control levers of a motor vehicle against actuation, and thus preclude the unauthorized use of the motor vehicle.

Another object of this invention resides in the provision of a motor vehicle lock which may be readily applied to a conventional motor vehicle and engaged or disengaged from the control levers, and when engaged therewith will positively prevent manipulation thereof to operate the vehicle.

With the preceding and other objects and advantages in mind, the invention consists in the novel combination of elements, constructions and arrangement of parts to be hereinafter specifically referred to, claimed and illustrated in the accompanying drawings, wherein:

Figure 3 is a longitudinal sectional view of the device mounted on the power plant base, the latter being shown in cross section;

Figure 4 is a fragmentary sectional detail view;

Figure 5 is a transverse section on line 5—5 of Figure 3;

Figure 6 is a longitudinal sectional view taken at right angles of Figure 3;

Figure 7 is a fragmentary perspective of parts of the invention; and

Figure 8 is a perspective of the shackle embodied in the invention.

Figure 1:
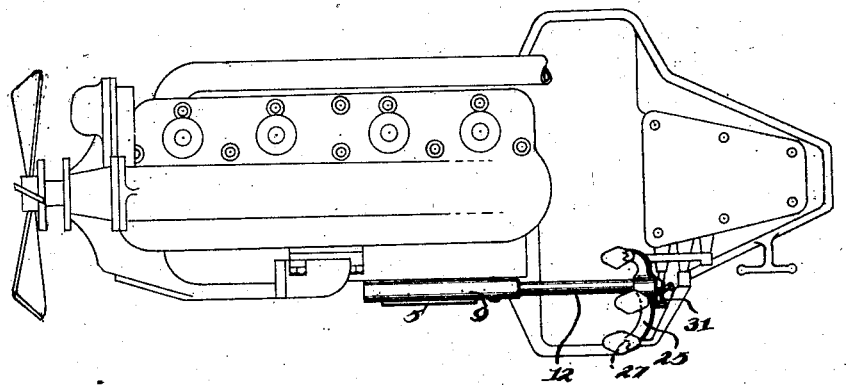
Figure 1 is a top plan view of an automobile power plant, control mechanism therefor and my improved lock in operative position to retain the control mechanism against actuation.

Referring to the invention in detail, a channel shaped bracket 5 is provided having upstanding ears or extensions 6, the bracket resting upon the power plant base and engaged by upstanding bolts 7 upon which nuts 8 are threaded.

A channel shaped casing 9 is provided and the parallel flanges thereof gradually increase in width toward their rear ends and terminate in parallel ears or extensions 10 which are received between the ears or extensions 6 and are pivotally connected thereto by means of a pivot pin 11 passing transversely through the ears or extensions 6 and 10.

Projecting longitudinally from the forward end of the casing 9 is a tube 12, the latter being secured to the casing by a flanged collar 13 which is welded or otherwise secured to the tube and to an inturned flange 14 formed on the forward end of the casing. A slidable tube 15 is longitudinally movable in the tube 12, but is held against rotation by a laterally disposed set screw 16 projecting into a longitudinal slot 17 extending substantially the length of the tube 12.

A locking rod 18 is slidably and rotatably received in the sleeve 15 and casing 9 and is formed with ratchet teeth 19 upon opposite sides thereof, which extend from a point adjacent its inner end to a point intermediate its end. These ratchet teeth are engageable by resilient latch plates 20 to lock the locking rod against longitudinal movement in one direction. As illustrated in Figure 6, the latch plates 20 are formed from relatively stout sheet metal and are secured at their inner ends to the parallel flanges of the casing 9 by rivets 21.

For the purpose of permitting rotation of the locking bar 18 to a position at right angles to its normal position, so as to dispose its ratchet teeth in a position where they will not engage the latch plates and thus permit withdrawal of the locking rod when the device is unlocked, pins 22 project laterally from opposite sides of the tube 15 and engage a circumferential groove 23 in the locking rod adjacent its outer end.

To engage and lock the control levers of a motor vehicle against actuation, a U-shaped shackle 25 is provided. This shackle 25 is formed with a collar 26 centrally of its ends, which is fixed to the outer end of the tube 15 by any suitable means, such as welding, and is revoluble about the projecting end of the locking rod 18.

Figure 2:
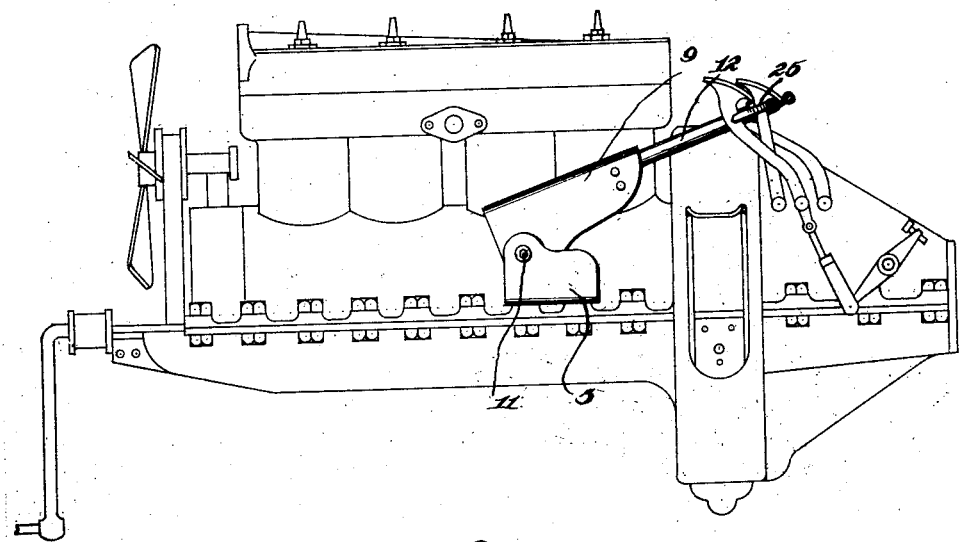
Figure 2 is a side elevation of the same.

As illustrated in Figure 8, each end of the shackle is provided with a notch adapted to receive one control lever of a motor vehicle. When the device is used in conjunction with a motor vehicle having more than two control levers, the crest of the shackle will engage the intermediate lever, as illustrated in Figures 1 and 2. While the device is herein illustrated as associated with foot levers of a well known type of motor vehicle, it is obvious that it may be employed to lock both the foot and hand levers of any conventional motor vehicle.

To lock the locking rod against rotation and hence preclude withdrawal of the same to disengage the shackle from the control levers, a lock mechanism is provided which comprises a spring pressed tumbler 28 mounted in a transverse recess 29 in the collar 26, and normally projected laterally from the inner face of the collar to engage a longitudinal slot 30 in the outer end of the locking rod when the slot is disposed in registration with the tumbler.

A small crank handle 31 is fixed to the outer end of the locking rod whereby the latter is rotated to dispose the ratchet teeth in a position to clear the latch plates 20, to permit withdrawal of the locking rod after a suitable flat key or blade is inserted in the slot 30 to force the tumbler laterally from the slot and into its recess 29.

When the device is not in use the casing 9 will assume a substantially horizontal position and the shackle supported upon a housing or other suitable part of the motor vehicle. However, when it is desired to lock the control levers, the casing 9 will be swung to the angular position illustrated in Figure 1, and the locking rod rotated to dispose the shackle at right angles to its normal position to permit it to pass between the foot levers. After the shackle is disposed rearwardly of the foot levers it is moved forwardly to engage the levers and then locked in this position.

With the device thus locked the automobile wheels are held against movement due to the fact that the brakes are locked in set position.

What is claimed is:

1. In a lever lock, a casing to be attached to part of a motor vehicle, latch plates carried thereby, a longitudinally movable and rotatable locking rod having teeth at opposite sides normally engaged with the latch plates, a shackle carried by the locking rod, means for locking the locking rod against rotation but operable to permit rotation of the locking rod to dispose the later in a position where its teeth will clear the latch plates and permit movement of the locking bar to disengage the shackle from the lever.

2. In an automobile lever lock, a bracket for attachment to part of an automobile engine casing, a casing attached to the bracket and adjustable about a horizontal axis, a locking rod carried by the casing and longitudinally adjustable therefrom, and a U-shaped shackle carried by the locking rod for engagement with the control levers of the automobile to lock the former in set position.

3. In combination a channel shaped casing to be attached to a fixed part of an automobile, a tubular member extending from one end thereof, a slidable tubular member received in the first mentioned tubular member, means for retaining the slidable tubular member against rotation, a longitudinally movable and rotatable rod in the casing and slidable tubular member, ratchet elements carried by the casing engageable with ratchet teeth along opposite sides of the rod to prevent longitudinal movement of the rod in one direction, a U-shaped member loosely fixed to one end of the slidable tubular member and loosely receiving one end of the rod, and cooperating latch means between the rod and shackle for preventing rotation of the rod.

4. In combination a channel shaped casing to be attached to a fixed part of an automobile, a tubular member extending from one end thereof, a slidable tubular member received in the first mentioned tubular member, means for retaining the slidable tubular member against rotation, a longitudinally movable and rotatable rod in the casing and slidable tubular member, ratchet elements carried by the casing engageable with ratchet teeth along opposite sides of the rod to prevent longitudinal movement of the rod in one direction, a U-shaped member loosely fixed to one end of the slidable tubular member and loosely receiving one end of the rod, cooperating latch means between the rod and slidable tubular member for preventing rotation of the rod, and a crank handle carried by one end of the rod for rotating the latter to a position where the rack teeth will not engage the ratchet elements to permit the withdrawal of the rod after the latch means has been rendered inoperative.

5. In a device of the character described a casing having a tubular extension, a tube slidably arranged in the tubular extension, a rod rotatable and slidable in the tube and casing, means normally retaining the rod against longitudinal movement in one direction and operable to permit such movement upon rotation of the rod to one position about its axis, a shackle carried by one end of the rod and engageable with an object to be locked, and cooperating lock means between the rod and tube to normally prevent unauthorized rotation of the rod.

OTTO ADOLPH MAY.